(12) United States Patent
Takeda et al.

(10) Patent No.: US 10,602,279 B2
(45) Date of Patent: Mar. 24, 2020

(54) LINEAR ACTUATOR

(71) Applicant: NIDEC SANKYO CORPORATION, Nagano (JP)

(72) Inventors: Tadashi Takeda, Nagano (JP); Hiroshi Kitahara, Nagano (JP); Masao Tsuchihashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/323,851

(22) PCT Filed: Aug. 3, 2017

(86) PCT No.: PCT/JP2017/028211
§ 371 (c)(1),
(2) Date: Feb. 7, 2019

(87) PCT Pub. No.: WO2018/030263
PCT Pub. Date: Feb. 15, 2018

(65) Prior Publication Data
US 2019/0182601 A1 Jun. 13, 2019

(30) Foreign Application Priority Data
Aug. 9, 2016 (JP) .................................. 2016-156892

(51) Int. Cl.
*H04R 9/06* (2006.01)
*H02K 33/16* (2006.01)
(Continued)

(52) U.S. Cl.
CPC ............... *H04R 9/06* (2013.01); *B06B 1/045* (2013.01); *H02K 3/46* (2013.01); *H02K 33/16* (2013.01);
(Continued)

(58) Field of Classification Search
CPC .......... H04R 9/025; H04R 9/046; H04R 9/06; H04R 9/066; H04R 11/02; H04R 2209/041; H02K 33/16; H02K 33/18
(Continued)

(56) References Cited

U.S. PATENT DOCUMENTS

| 6,217,508 B1 * | 4/2001 | Ball | H04R 11/02 |
|---|---|---|---|
| | | | 600/25 |
| 2009/0320219 A1 * | 12/2009 | Takahashi | H02K 33/16 |
| | | | 15/21.1 |

(Continued)

FOREIGN PATENT DOCUMENTS

| JP | 11018182 A | 1/1999 |
|---|---|---|
| JP | 2010011604 A | 1/2010 |

(Continued)

OTHER PUBLICATIONS

International Search Report corresponding to Application No. PCT/JP2017/028211; dated Oct. 31, 2017.

*Primary Examiner* — Huyen D Le
(74) *Attorney, Agent, or Firm* — Cantor Colburn LLP

(57) ABSTRACT

A linear actuator may include a movable element having a plurality of permanent magnets stacked in a direction of an axis line; a stationary element comprising a plurality of coils surrounding a circumferential section of the permanent magnets, the plurality of coils being placed along the axis line; and viscous elastic members inserted between the movable element and the stationary element. The plurality of permanent magnets are arranged such that, among adjacent permanent magnets of the plurality of permanent magnets, sides of the adjacent permanent magnets facing each other have a same polarity. The viscous elastic members are provided at a plurality of locations being separate in the direction of the axis line, in a space sandwiched in a radial (Continued)

direction by the movable element and the stationary element.

20 Claims, 6 Drawing Sheets

(51) Int. Cl.
| | | |
|---|---|---|
| *B06B 1/04* | (2006.01) | |
| *H04R 11/02* | (2006.01) | |
| *H02K 3/46* | (2006.01) | |
| *H04R 1/02* | (2006.01) | |
| *H04R 9/02* | (2006.01) | |
| *H04R 9/04* | (2006.01) | |

(52) U.S. Cl.
CPC ............ *H04R 1/025* (2013.01); *H04R 9/025* (2013.01); *H04R 9/046* (2013.01); *H04R 9/066* (2013.01); *H04R 11/02* (2013.01); *H02K 2203/12* (2013.01); *H04R 2209/041* (2013.01)

(58) Field of Classification Search
USPC ....... 381/396, 401, 412, 413, 414, 415, 420, 381/421, 422, 418; 310/14
See application file for complete search history.

(56) References Cited

U.S. PATENT DOCUMENTS

| | | | |
|---|---|---|---|
| 2012/0025635 A1* | 2/2012 | Iwaki | .................... H01F 7/1615 310/14 |
| 2017/0214306 A1* | 7/2017 | Katada | .................... B06B 1/045 |

FOREIGN PATENT DOCUMENTS

| | | |
|---|---|---|
| JP | 2010104717 A | 5/2010 |
| JP | 2016101075 A | 5/2016 |
| WO | 2010119788 A1 | 10/2010 |
| WO | 2016017585 A1 | 2/2016 |
| WO | 2017047535 A1 | 3/2017 |

\* cited by examiner

FIG. 5A 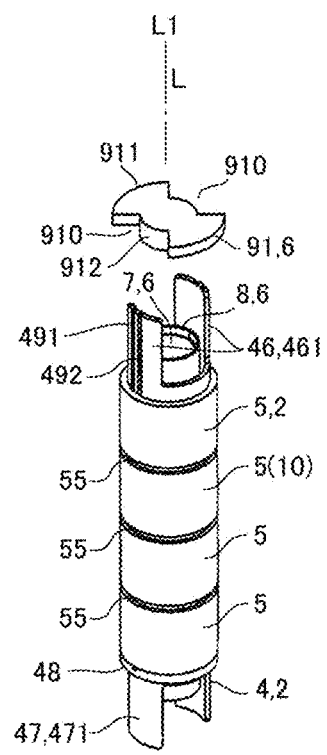 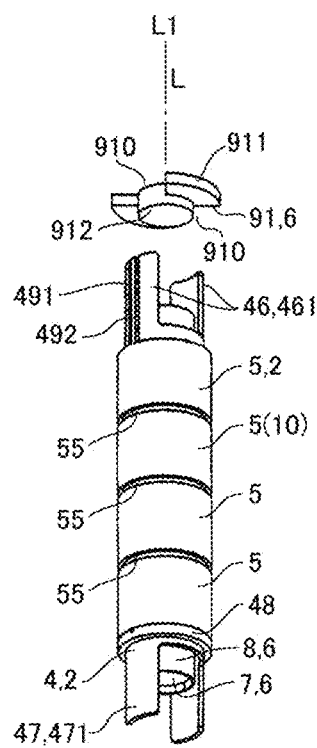 FIG. 5B

LINEAR ACTUATOR

CROSS REFERENCE TO RELATED APPLICATIONS

This is the U.S. national stage of application No. PCT/JP2017/028211, filed on Aug. 3, 2017. Priority under 35 U.S.C. § 119(a) and 35 U.S.C. § 365(b) is claimed from Japanese Application No. 2016-156892, filed Aug. 9, 2016; the disclosures of which are incorporated herein by reference.

FIELD OF THE INVENTION

At least an embodiment of the present invention relates to a linear actuator provided with a viscous elastic member for suppressing resonance.

BACKGROUND

As a device for notifying of information by way of a vibration, there is proposed a liner actuator that includes a movable element equipped with a plurality of permanent magnets in a direction of an axis line (a vibrating direction), and a stationary element having a coil placed around the permanent magnets. For the liner actuator, there is proposed a structure; in which the movable element is supported with a spring component being plate-like, and a viscous elastic member for suppressing resonance of the movable element is placed at a position sandwiched between the movable element and the stationary element in the direction of an axis line (refer to Patent Document 1).

PATENT DOCUMENT

Patent Document 1: Japanese Unexamined Patent Application Publication No. 2016-101075

In the case where a plurality of permanent magnets are stacked in order to enhance a thrust power in a linear actuator, a dimension of a movable element in a direction of an axis line becomes great so that the movable element is liable to get tilted. Accordingly, there exists a problem that a structure of supporting the movable element, with a spring component being plate-like, is liable to cause plastic deformation and the like of the spring component. Moreover, in the case where the dimension of the movable element in the direction of an axis line becomes great so as to make the movable element liable to get tilted, it also becomes difficult for a viscous elastic member placed at a position, sandwiched between the movable element and the stationary element in the direction of the axis line, to appropriately support the movable element.

SUMMARY

With the issue described above being taken into consideration, at least an embodiment of the present invention provides a linear actuator in which an increase of the dimension of the movable element in the direction of the axis line can be controlled and the movable element can appropriately be supported even in the case where a thrust power is enhanced.

In order to solve the issue described above, a linear actuator according to at least an embodiment of the present invention includes: a movable element provided with a plurality of permanent magnets so placed as to be stacked in a direction of an axis line; a stationary element in which a plurality of coils surrounding a circumferential section of the permanent magnets are placed along the axis line; and viscous elastic members inserted between the movable element and the stationary element; wherein, with respect to the plurality of permanent magnets, the permanent magnets positioned next to each other in the direction of the axis line are placed in such a way that the same-polarity parts face each other; and the viscous elastic members are provided at a plurality of locations being separate in the direction of the axis line, in a space sandwiched in a radial direction by the movable element and the stationary element.

According to at least an embodiment of the present invention; in the movable element, the plurality of permanent magnets are stacked in the direction of the axis line; and in the meantime the permanent magnets positioned next to each other in the direction of the axis line are placed in such a way that the same-polarity parts face each other. Therefore, density of magnetic flux, generated from a location between the permanent magnets positioned next to each other, is high. Accordingly, even in the case of enhancing a thrust power, the number of permanent magnets can be reduced so that an increase of a dimension of the movable element in the direction of the axis line can be controlled. Furthermore, viscous elastic members for suppressing resonance of the movable element are provided at a plurality of locations being separate in the direction of the axis line, so that the movable element can appropriately be supported by the viscous elastic members, without using any spring component, even though the dimension of the movable element in the direction of the axis line is great.

According to at least an embodiment of the present invention; adopted may be a mode, in which three or more permanent magnets are stacked in the movable element. According to the mode, even in the case of enhancing a thrust power, the number of permanent magnets can be reduced.

According to at least an embodiment of the present invention; adopted may be a mode, in which the movable element comprises; a sleeve, being non-magnetic and cylindrical, which surrounds a circumferential section of the permanent magnets; a first magnetic plate, being provided at one end side of the sleeve in the direction of the axis line, and contacting one piece of the permanent magnets, which is provided at one end in the direction of the axis line, among the plurality of the permanent magnets; a second magnetic plate, being provided at the other end side of the sleeve in the direction of the axis line, and contacting one piece of the permanent magnets, which is provided at the other end in the direction of the axis line, among the plurality of the permanent magnets; and an external yoke, being provided with a cylindrical part that surrounds the coils at an external side in a radial direction; wherein, the first magnetic plate and the one end of the cylindrical part in the direction of the axis line are connected to each other; and the second magnetic plate and the other end of the cylindrical part in the direction of the axis line are connected to each other. According to the mode, straightness of a stacked assembly of the plurality of permanent magnets can be secured by the sleeve, and a repulsion force acting between the permanent magnets positioned next to each other in the direction of the axis line can be controlled by the first magnetic plate and the second magnetic plate.

According to at least an embodiment of the present invention; adopted may be a mode, in which the first magnetic plate comprises; a first plate part connected to the one end of the cylindrical part in the direction of the axis line, and a first convex part that protrudes from the first plate part toward an internal side of the sleeve in such a way as to contact the one piece of the permanent magnets, which is provided at the one end in the direction of the axis line, among the plurality of the permanent magnets; and the second magnetic plate comprises; a second plate part connected to the other end of the cylindrical part in the direction of the axis line, and a second convex part that protrudes from the second plate part toward an internal side of the sleeve in such a way as to contact the one piece of the permanent magnets, which is provided at the other end in the direction of the axis line, among the plurality of the permanent magnets.

According to at least an embodiment of the present invention; adopted may be a mode, in which the first magnetic plate is connected to the cylindrical part by way of welding, and the external yoke is formed in such a way as to make the cylindrical part and the second magnetic plate as a single section.

According to at least an embodiment of the present invention; adopted may be a mode, in which the stationary element includes; a first bobbin holder placed at the one side in the direction of the axis line in relation to the first magnetic plate; a second bobbin holder placed at the other side in the direction of the axis line in relation to the second magnetic plate; and a bobbin being tubular, which stretches between the permanent magnets and the external yoke, in the direction of the axis line; and on an external circumferential surface of which the coils are wound around; and in the first magnetic plate, there is formed a first through-hole part through which a first connecting part, for connecting the bobbin and the first bobbin holder, passes; and in the second magnetic plate, there is formed a second through-hole part, through which a second connecting part, for connecting the bobbin and the second bobbin holder, passes.

According to at least an embodiment of the present invention; adopted may be a mode, in which the first connecting part includes a first connecting plate that protrudes from the bobbin toward the first bobbin holder, so as to be connected to the first bobbin holder; and the second connecting part includes a second connecting plate that protrudes from the bobbin toward the second bobbin holder, so as to be connected to the second bobbin holder.

According to at least an embodiment of the present invention; adopted may be a mode, in which the first connecting part includes a first supporting plate that protrudes from the first bobbin holder toward the bobbin, and overlaps with the first connecting plate; and the second connecting part includes a second supporting plate that protrudes from the second bobbin holder toward the bobbin, and overlaps with the second connecting plate.

According to at least an embodiment of the present invention; adopted may be a mode, in which, on an external circumferential surface of the bobbin, there is provided a groove in order to guide an end part of a coil wire that makes up the coils, in the direction of the axis line. According to the mode, the end part of the coil wire can be guided by making use of the external circumferential surface of the bobbin, even in the case where the coils are provided in plurality in the direction of the axis line.

According to at least an embodiment of the present invention; adopted may be a mode, in which the stationary element comprises a case having a torso part surrounding a circumferential section of the external yoke; and at least one of the cylindrical part of the external yoke and the torso part of the case protrudes toward the other, in such a way as to make up a stopper that regulates a movable range of the movable element in a direction perpendicular to the axis line. According to the mode, the external yoke contacts the torso part of the case before the bobbin contacts the sleeve and the coils contact the external yoke, in such a way that the movable range of the movable element in the direction perpendicular to the axis line can be regulated. Therefore, damage on the bobbin and the coils can be suppressed.

According to at least an embodiment of the present invention; adopted may be a mode, in which the plurality of viscous elastic members are placed, between the external yoke and the torso part, being at the one side as well as the other side in the direction of the axis line, in relation to the stopper. According to the mode, the movable element can appropriately be supported by the viscous elastic members.

According to at least an embodiment of the present invention; adopted may be a mode, in which the torso part in the case is made up by use of a plurality of casing members arranged in a circumferential direction. According to the mode, the viscous elastic members can easily be placed inside the torso part of the case.

According to at least an embodiment of the present invention; adopted may be a mode, in which the case is provided with a bottom plate part at either one of the one side and the other side in the direction of the axis line; and in the bottom plate part, there is provided a sounding hole that discharges a pressure change, in accordance with a vibration of the movable element in the direction of the axis line, as an audible level sound. According to the mode, information can be output by use of a sound discharged from the sounding hole.

Advantageous Effect of the Invention

According to at least an embodiment of the present invention; in the movable element, the plurality of permanent magnets are stacked in the direction of the axis line; and in the meantime the permanent magnets positioned next to each other in the direction of the axis line are placed in such a way that the same-polarity parts face each other. Therefore, density of magnetic flux, generated from a location between the permanent magnets positioned next to each other, is high. Accordingly, even in the case of enhancing a thrust power, the number of permanent magnets can be reduced so that an increase of a dimension of the movable element in the direction of the axis line can be controlled. Furthermore, viscous elastic members for suppressing resonance of the movable element are provided at a plurality of locations being separate in the direction of the axis line, so that the movable element can appropriately be supported by the viscous elastic members, without using any spring component, even though the dimension of the movable element in the direction of the axis line is great.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5A and FIG. 5B is an exploded perspective view of the linear actuator shown in FIG. 1A and FIG. 1B, wherein an external yoke is dismounted from an outside part of coils.

DETAILED DESCRIPTION

At least an embodiment of the present invention are explained below with reference to the drawings. In an explanation described below, an axis line of a movable element 6 is referred to as 'L'; and in an extending direction of the axis line L (a vibrating direction of the movable element 6), one side is provided with a symbol 'L1', and the other side is provided with a symbol 'L2' in the explanation.

(General Configuration)

Figure 1A:
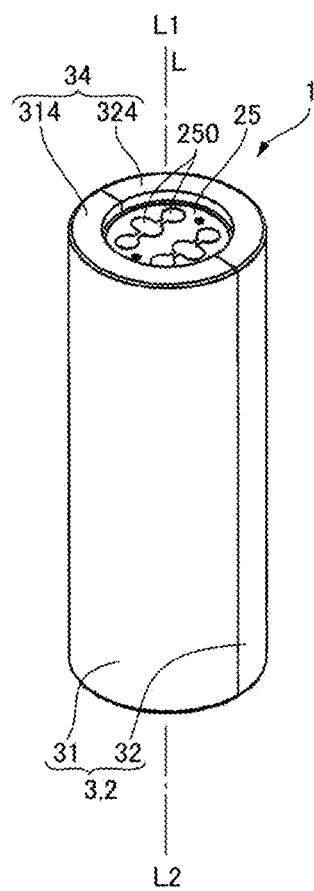
FIG. 1A and FIG. 1B includes perspective views of a linear actuator to which at least an embodiment of the present invention is applied.
Figure 1B:
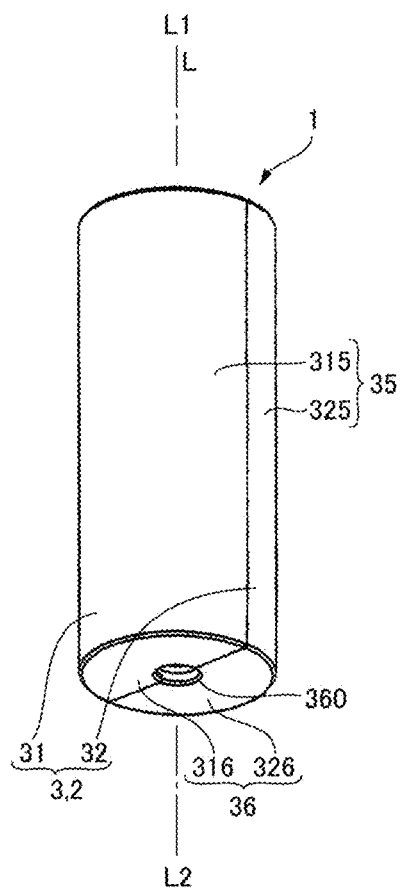
Figure 2A:
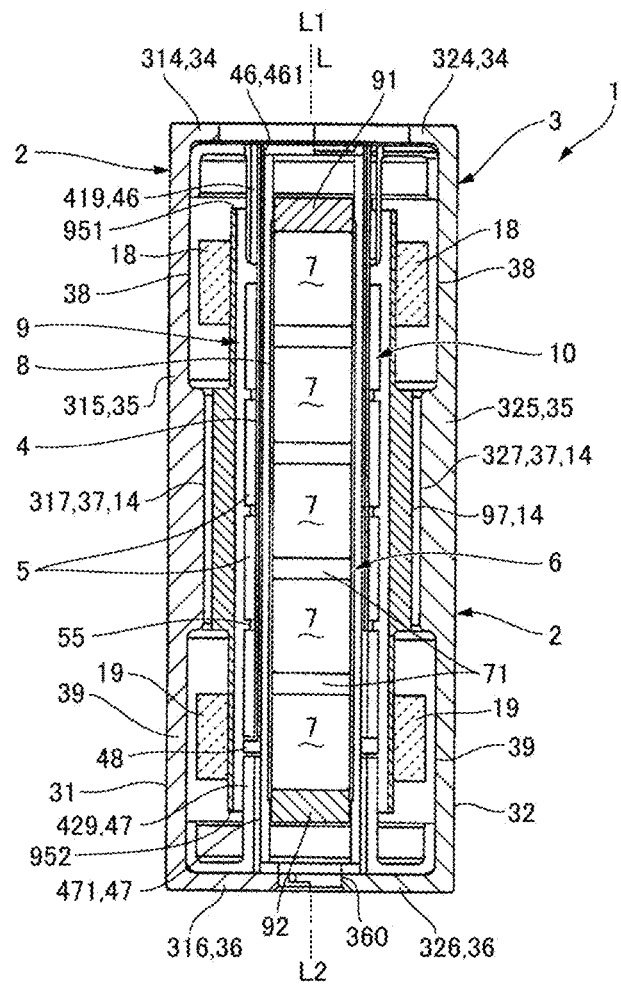
FIG. 2A and FIG. 2B includes cross-sectional views of the linear actuator shown in FIG. 1A and FIG. 1B.
Figure 2B:
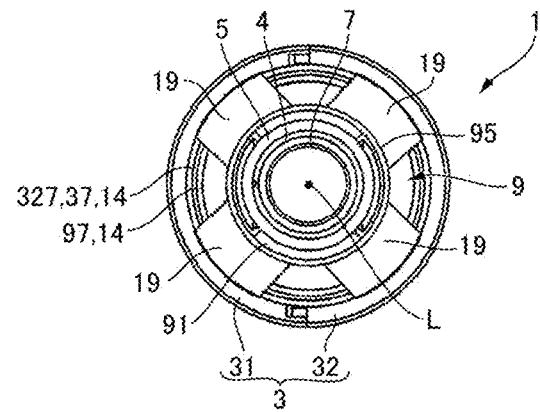

FIG. 1A and FIG. 1B include perspective views of a linear actuator 1 to which at least an embodiment of the present invention is applied; wherein FIG. 1A and FIG. 1B are a perspective view in which the linear actuator 1 is viewed from one side L1, and another perspective view in which the linear actuator 1 is viewed from the other side L2, respectively. FIG. 2A and FIG. 2B include cross-sectional views of the linear actuator 1 shown in FIG. 1A and FIG. 1B; wherein FIG. 2A and FIG. 2B are a longitudinal cross-sectional view in which the linear actuator 1 is sectioned along the axis line L, and a lateral cross-sectional view in which the linear actuator 1 is sectioned along a plane perpendicular to the axis line L.

The linear actuator 1 shown in FIG. 1A and FIG. 1B have a shaft form extending in the direction of the axis line L, and notifies a user holding the linear actuator 1 of information by means of a vibration and the like. Therefore, the linear actuator 1 can be used as an operation section and the like of a game machine, in such a way as to make it possible to realize a new feeling by means of a vibration and the like. As shown in FIG. 2A and FIG. 2B, the linear actuator 1 is provided with a stationary element 2, including a cylindrical case 3 and the like, and a movable element 6, being supported inside the case 3 so as to be movable in relation to the stationary element 2 in the direction of the axis line L; wherein the movable element 6 outputs information by means of a vibration in the direction of the axis line L. In the present embodiment, as explained below with reference to FIG. 2A and FIG. 2B through FIG. 6; the stationary element 2 is provided with the case 3, a bobbin 4, coils 5, and the like; meanwhile the movable element 6 is provided with permanent magnets 7, which makes up a magnetic drive mechanism 10 together with the coils 5, a sleeve 8, an external yoke 9, and the like. The movable element 6 is supported by the stationary element 2, by way of viscous elastic members 18 and 19, and no spring component is used for supporting the movable element 6.

(Configuration of the Case 3)

Figure 3:
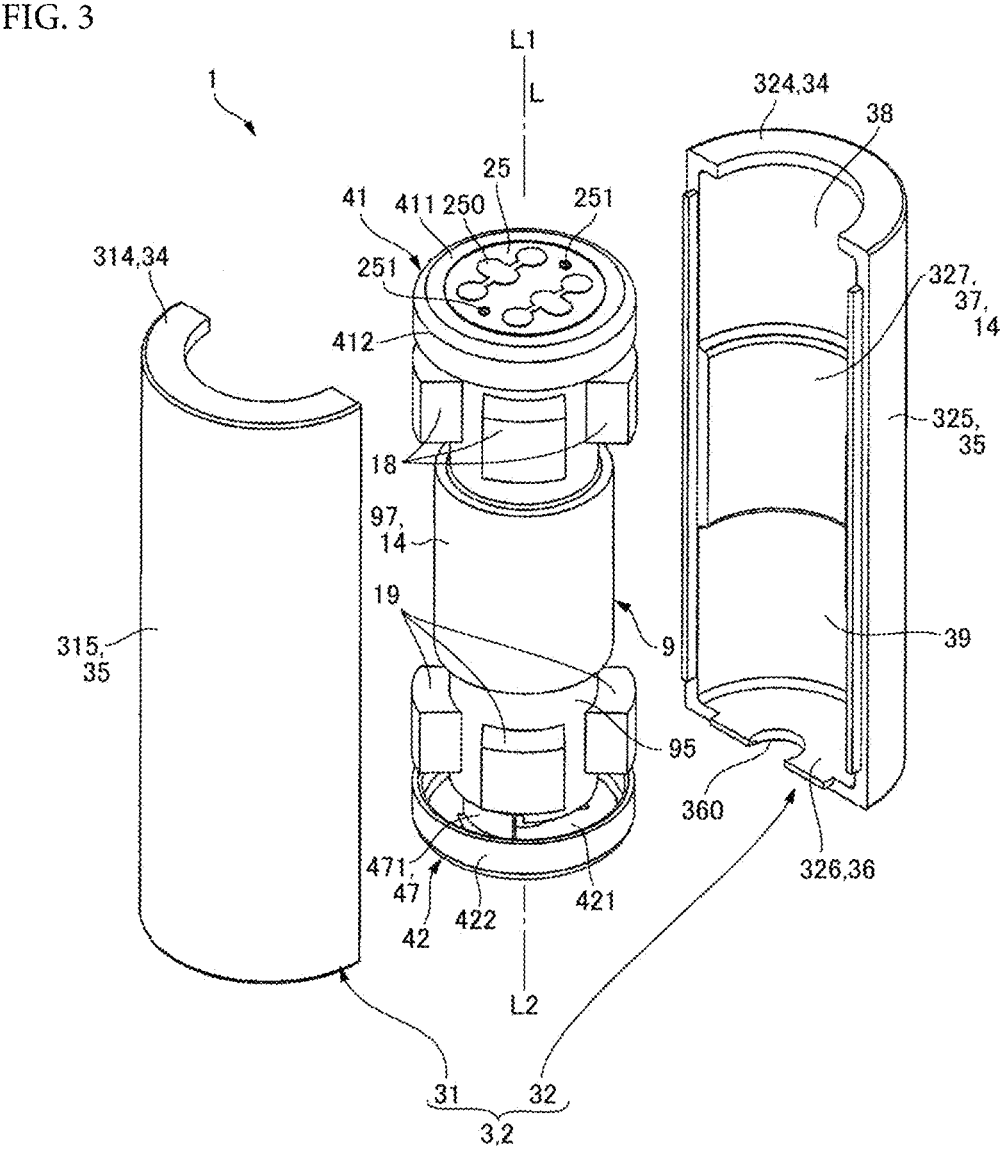
FIG. 3 is an exploded perspective view of the linear actuator shown in FIG. 1A and FIG. 1B, wherein a case is dismounted.

FIG. 3 is an exploded perspective view of the linear actuator 1 shown in FIG. 1A and FIG. 1B, wherein the case is dismounted. As shown in FIG. 1A and FIG. 1B, FIG. 2A and FIG. 2B and FIG. 3, the case 3 in the stationary element 2 includes a cylindrical torso part 35 stretching in the direction of the axis line L, a bottom plate part 36 provided at the other side L2 in the direction of the axis line L of the torso part 35, and an annular part 34 provided at the one side L1 in the direction of the axis line L of the torso part 35. From an inner side of the annular part 34, a wiring substrate 25 becomes exposed; and the coils 5 are externally supplied with a drive signal by making use of a land 250 of the wiring substrate 25. At a center of the bottom plate part 36, there is shaped a sounding hole 360 to be described later. At an inner circumferential side of the torso part 35, there exists a small diameter part 37, where an almost middle position in the direction of the axis line L has a smaller inner diameter than both end sides in the direction of the axis line L have; and meanwhile, the both end sides in relation to the small diameter part in the direction of the axis line L become large diameter parts 38 & 39 having a larger inner diameter than the small diameter part 37 has.

The case 3 has a form of being split in a circumferential direction, into a plurality of casing members (a first casing member 31 and a second casing member 32); and the case 3 is built up by combining the first casing member 31 and the second casing member 32. The first casing member 31 and the second member 32 are provided with; side plate parts 315 and 325 for making up the torso part 35, each side plate part having a semi-circular shape in its sectional view; first end plate parts 316 and 326 for making up the bottom plate part 36, each first end plate part having an almost semi-circular shape; and second end plate parts 314 and 324 for making up the annular part 34, each second end plate part having an arc-like shape, respectively. Inside the side plate parts 315 and 325, there exist convex parts 317 and 327 for making up the small diameter part 37, each convex part extending in a circumferential direction.

(Configuration of the Movable Element 6)

Figure 4:
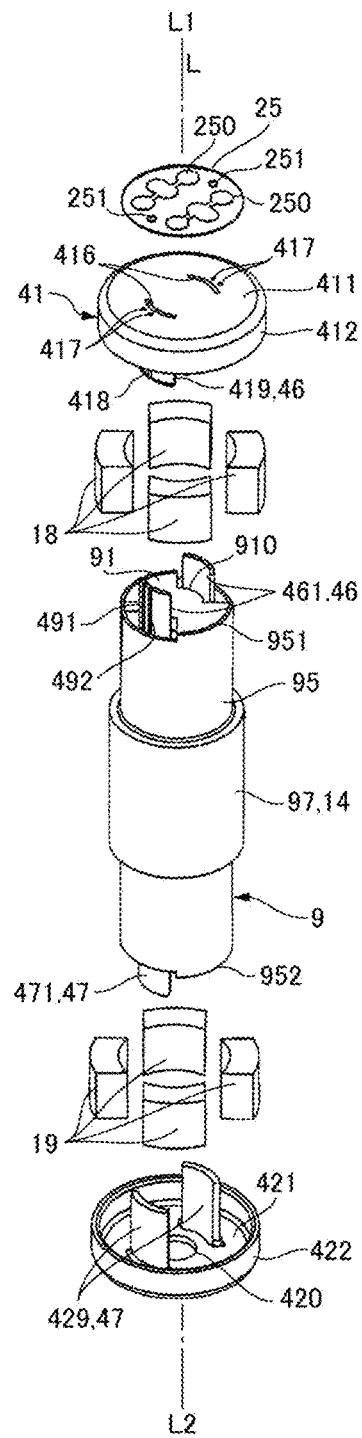
FIG. 4 is an exploded perspective view of the linear actuator shown in FIG. 1A and FIG. 1B, wherein components placed inside the case are disassembled.
Figure 6:
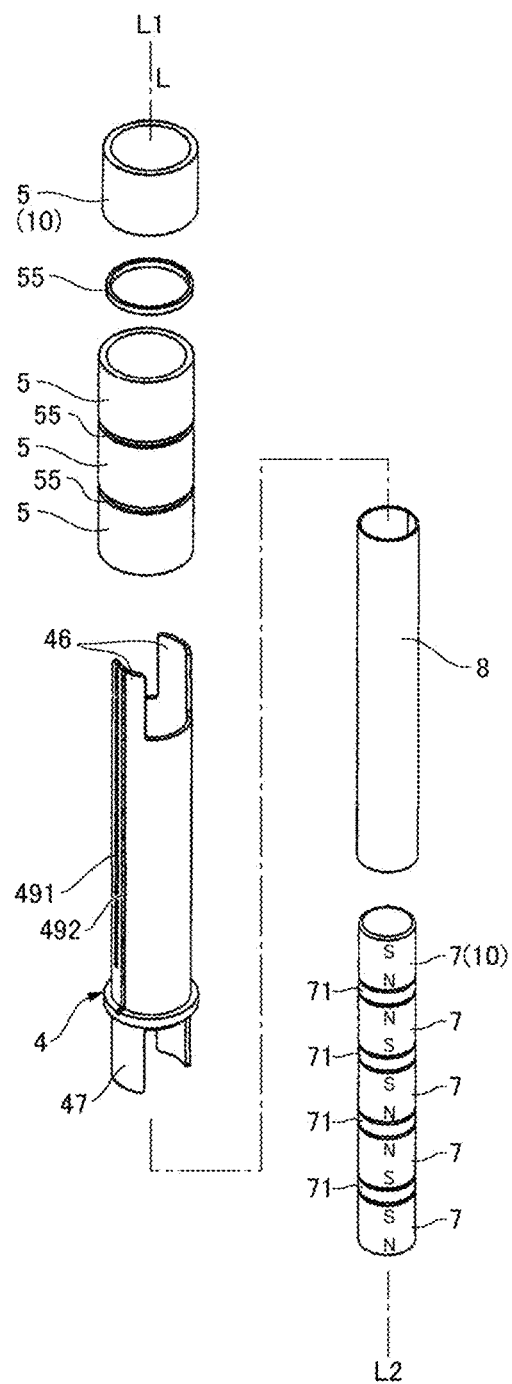
FIG. 6 is an exploded perspective view of the linear actuator shown in FIG. 1A and FIG. 1B, wherein permanent magnets and the like are dismounted from an inside part of the coils.

FIG. 4 is an exploded perspective view of the linear actuator 1 shown in FIG. 1A and FIG. 1B, wherein components placed inside the case are disassembled. FIG. 5A and FIG. 5B are an exploded perspective view of the linear actuator 1 shown in FIG. 1A and FIG. 1B, wherein the external yoke is dismounted from an outside part of the coils; and FIG. 5A and FIG. 5B show conditions viewed from the one side L1 in the direction of the axis line L, and conditions viewed from the other side L2 in the direction of the axis line L, respectively. FIG. 6 is an exploded perspective view of the linear actuator 1 shown in FIG. 1A and FIG. 1B, wherein the permanent magnets and the like are dismounted from an inside part of the coils. As shown in FIG. 2A and FIG. 2B and FIG. 6, the permanent magnets 7 are placed in plurality so as to be stacked in the direction of the axis line L, in the movable element 6. For example, three or more permanent magnets 7 are stacked in the movable element 6. In the present embodiment, five permanent magnets 7 are placed so as to be stacked in the direction of the axis line L. The permanent magnets 7 are columnar; and there is placed a spacer 71, made of a magnetic plate being disk-like, between two permanent magnets 7 positioned next to each other in the direction of the axis line L.

In the permanent magnets 7 in plurality, as represented with 'N' and 'S' in FIG. 6; with regard to the permanent magnets 7 positioned next to each other in the direction of an axis line, those permanent magnets 7 are placed in such a way that the same-polarity parts face each other. For example, in the direction of the axis line L, with respect to a first piece from the one side L1 of the permanent magnets 7 and a second piece from the one side L1 of the permanent magnets 7, their N-polarity parts face each other by the intermediary of the spacer 71; in the meantime, with respect to a 21st piece of the permanent magnets 7 and a third piece of the permanent magnets 7, their S-polarity parts face each other by the intermediary of the spacer 71.

Accordingly, though there is generated a repulsion force between the permanent magnets 7 positioned next to each other, the permanent magnets 7 are so suppressed as to be aligned in the direction of the axis line L, by use of the sleeve 8, the external yoke 9, a first magnetic plate 91, and a second magnetic plate 92 that are explained below with reference to FIG. 2A and FIG. 2B, FIG. 3, FIG. 4, FIG. 5A and FIG. 5B, FIG. 6 and so forth.

As shown in FIG. 2A and FIG. 2B, FIG. 5A and FIG. 5B, and FIG. 6, the movable element 6 includes the sleeve 8, being non-magnetic and cylindrical, which surrounds a circumferential section of the permanent magnets 7; and the sleeve 8 is provided with a length in such a way that the sleeve 8 protrudes at the one side L1 and the other side L2 in the direction of the axis line L, out of pieces of the permanent magnets 7 that are positioned at both ends in the direction of the axis line L. Therefore, the pieces of the permanent magnets 7, positioned at both the ends in the direction of the axis line L, are each indented inward, being in comparison to both ends of the sleeve 8 in the direction of the axis line L. The permanent magnets 7 and the sleeve 8 are fastened to each other by use of an adhesive (not shown); and in the meantime, the spacer 71 and the sleeve 8 are fastened to each other by use of an adhesive (not shown). At a time of rolling a sheet for the sleeve 8 so as to surround the permanent magnets 7 and the spacer 71 retained by use of a jig (not shown), the sleeve 8 is fastened to the permanent magnets 7 and the spacer 71 by use of the adhesive. Therefore, the permanent magnets 7 and the spacer 71 are supported by the sleeve 8 with a high-level linearity in the direction of the axis line L; and in the meantime, there are placed the coils 5 wound around the bobbin 4, at an external side of the sleeve 8 in a radial direction, in such a way as to be distant from the sleeve 8.

The movable element 6 includes; the first magnetic plate 91 provided at the one side L1 in the direction of the axis line L of the sleeve 8, the second magnetic plate 92 provided at the other side L2 in the direction of the axis line L of the sleeve 8, and the external yoke 9 provided with a cylindrical part 95 that surrounds the coils 5 at an external side in a radial direction. The cylindrical part 95 of the external yoke 9 is distant from the coils 5. The first magnetic plate 91 is connected to an end part 951 of the one side L1 in the direction of the axis line L of the cylindrical part 95 of the external yoke 9, in a state where the first magnetic plate 91 contacts one piece of the permanent magnets 7, which is provided at an end of the one side L1 in the direction of the axis line L, among the plurality of the permanent magnets 7. The second magnetic plate 92 is connected to an end part 952 of the other side L2 in the direction of the axis line L of the cylindrical part 95 of the external yoke 9, in a state where the second magnetic plate 92 contacts one piece of the permanent magnets 7, which is provided at an end of the other side L2 in the direction of the axis line L, among the plurality of the permanent magnets 7.

In the present embodiment, the first magnetic plate 91 is provided with a first plate part 911 connected to the end part 951 of the cylindrical part 95, and a first convex part 912 that protrudes from the first plate part 911 toward an internal side of the sleeve 8 in such a way as to contact the permanent magnet 7. The second magnetic plate 92 is provided with a second plate part 921 connected to the end part 952 of the cylindrical part 95, and a second convex part 922 that protrudes from the second plate part 921 toward an internal side of the sleeve 8 in such a way as to contact the permanent magnet 7. Therefore, the permanent magnets 7 and the spacer 71 are retained by the first magnetic plate 91 and the second magnetic plate 92 from both the sides in the direction of the axis line L. In the present embodiment, the first magnetic plate 91 is connected to the cylindrical part 95 by way of welding, and the external yoke 9 is formed in such a way as to make the cylindrical part 95 and the second magnetic plate 92 as a single section.

On an external circumferential surface of the cylindrical part 95 of the external yoke 9, there is a large diameter part 97 where a position, facing the small diameter part 37 of the case 3, protrudes outward in a radial direction. The large diameter part 97 contacts the small diameter part 37 of the case 3 at a time when the movable element 6 moves in a direction that intersects with the axis line L. Therefore, both of the diameter part 97 shaped in the cylindrical part 95 of the external yoke 9 and the small diameter part 37 shaped in the torso part 35 of the case 3 make up a stopper 14 that regulates a movable range of the movable element 6 in a direction perpendicular to the axis line L, by means of the diameter part 97 and the small diameter part 37 contacting each other at a time when the movable element 6 moves in the direction perpendicular to the axis line L.

(Configuration of the Stationary Element 2)

As shown in FIG. 2A and FIG. 2B, FIG. 3, FIG. 4, FIG. 5A and FIG. 5B and FIG. 6, the stationary element 2 includes; a first bobbin holder 41 placed at the one side L1 in the direction of the axis line L in relation to the first magnetic plate 91; a second bobbin holder 42 placed at the other side L2 in the direction of the axis line L in relation to the second magnetic plate 92; and the bobbin 4 being tubular, which stretches between the sleeve 8 and the external yoke 9, in the direction of the axis line L.

The first bobbin holder 41 and the first magnetic plate 91 are distant from each other in the direction of the axis line L, and the second bobbin holder 42 and the second magnetic plate 92 are distant from each other in the direction of the axis line L, and then the bobbin 4 is distant from the sleeve 8 as well as the external yoke 9 in a radial direction. In the stationary element 2; on an external circumferential surface of the bobbin 4, the coils 5 are wound around at a plurality of locations in the direction of the axis line L; and the coils 5 face gaps of the permanent magnets 7 by the intermediary of the bobbin 4 and the sleeve 8, each gap being located between neighboring two of the permanent magnets 7 positioned next to each other in the direction of the axis line L. At an external circumferential side of the bobbin 4, a flange part 48 is formed at an end part of the other side L2 in the direction of the axis line L; and then between two coils 5 positioned next to each other in the direction of the axis line L, there is placed a spacer 55 being annular.

The first bobbin holder 41 includes a first end plate part 411 being circular, and a first side plate part 412, being tubular, which is bent from an outer rim of the first end plate part 411 toward the other side L2 in the direction of the axis line L; and the wiring substrate 25 is placed so as to be stacked on a surface at the one side L1 of the first end plate part 411 in the direction of the axis line L. In the first end plate part 411, there are shaped two slits 416, being arc-like; and there are formed two through-holes 417 in the vicinity of each of the two slits 416. Moreover, one of the two through-holes 417 overlaps with a through-hole 251 formed in the wiring substrate 25. Therefore, an end part of a coil wire used as the coils 5 can be guided up to the land 250 of the wiring substrate 25, by way of the through-holes 417 and 251.

In the present embodiment, for connecting the bobbin 4 and the first bobbin holder 41; in the first magnetic plate 91, there is formed a first through-hole part 910, through which a first connecting part 46, for connecting the bobbin 4 and the first bobbin holder 41, passes. The first through-hole part 910 is a cutout part that is cut out so as to be fan-shaped in the first plate part 911, around the first convex part 912 of the first magnetic plate 91. The first connecting part 46 includes; a couple of first connecting plates 461 that protrude from the bobbin 4 toward the first bobbin holder 41, and a couple of first supporting plates 419 that protrude from the first bobbin holder 41 toward the bobbin 4; and in the present embodiment, the first connecting plates 461 and the first supporting plates 419 overlap with each other, while individually having an arc-like sectional configuration. Furthermore, the couple of first connecting plates 461 individually fit into the two slits 416 shaped in the first end plate part 411 of the first bobbin holder 41. Therefore, the first bobbin holder 41 and the first connecting plates 461 can be connected inside the slits 416 by way of welding and the like.

The second bobbin holder 42 includes a second end plate part 421 being circular, and a second side plate part 422, being tubular, which is bent from an outer rim of the second end plate part 421 toward the one side L1 in the direction of the axis line L; and at a center of the second end plate part 421, there is shaped an opening part 420 that overlaps with the sounding hole 360 provided at the bottom plate part 36 of the case 3. Incidentally, the bottom plate part 36 as well as the second end plate part 421 are provided in such a way as to become perpendicular to the direction of the axis line L.

In the present embodiment, for connecting the bobbin 4 and the second bobbin holder 42; in the second magnetic plate 92, there is formed a second through-hole part 920, through which a second connecting part 47, for connecting the bobbin 4 and the second bobbin holder 42, passes. The second through-hole part 920 is a cutout part that is cut out so as to be fan-shaped in the second plate part 921, around the second convex part 922 of the second magnetic plate 92. In the present embodiment, the second connecting part 47 includes; a couple of second connecting plates 471 that protrude from the bobbin 4 toward the second bobbin holder 42, and a couple of second supporting plates 429 that protrude from the second bobbin holder 42 toward the bobbin 4; and in the present embodiment, the second connecting plates 471 and the second supporting plates 429, individually having an arc-like sectional configuration, are connected by way of welding and the like, in a state of overlapping with each other.

In the present embodiment; on an external circumferential surface of the bobbin 4 and an external circumferential surface of the first supporting plates 419, there are provided grooves 491, 492, and 418 in order to guide an end part of a coil wire (not shown) that makes up the coils 5, in the direction of the axis line L; and in the meantime, the grooves 491 and 492 extend up to an external circumferential surface of the first connecting plates 461. Therefore, at a time of connecting the bobbin 4 and the first bobbin holder 41, the grooves 491, 492, and 418 are linked up. Accordingly, the end part of the coil wire can be guided up to the land 250 of the wiring substrate 25, by way of the grooves 491, 492, & 418, and the through-holes 417 and the through-hole 251.

(Configuration of the Viscous Elastic Members 18 and 19)

In the present embodiment, the movable element 6 is supported by the viscous elastic members 18 and 19 in such a way as to be linearly movable in a reciprocating manner in the direction of the axis line L; the viscous elastic members 18 and 19 being provided at a plurality of positions being distant from each other in the direction of the axis line L, and provided in a section where the movable element 6 and the stationary element 2 face each other in a direction perpendicular to the direction of the axis line L. Meanwhile, the viscous elastic members 18 and 19, being provided in plurality, are placed, between the external yoke 9 and the torso part 35, being at both sides of the one side L1 and the other side L2 in the direction of the axis line L, in relation to the stopper 14.

In the present embodiment, the viscous elastic members 18 provided at the one side L1 in the direction of the axis line L, in relation to the stopper 14, are individually fixed to each of an external circumferential surface of the cylindrical part 95 of the external yoke 9 and an internal circumferential surface of the torso part 35 of the case 3; at each of four locations equally spaced angularly in a circumferential direction. Furthermore, the viscous elastic members 19 provided at the other side L2 in the direction of the axis line L, in relation to the stopper 14, are also individually fixed to each of an external circumferential surface of the cylindrical part 95 of the external yoke 9 and an internal circumferential surface of the torso part 35 of the case 3; at each of four locations equally spaced angularly in a circumferential direction, in the same manner as the viscous elastic members 18 are. Incidentally, the viscous elastic members 18 and 19 are made of silicone gel having a needle entering level of 90 to 110. The 'needle entering level' is specified in JIS-K-2207 and JIS-K-2220; and the smaller the value is, it means that the harder the material is. In the meantime, 'viscous elasticity' represents a combined property including both of viscosity and elasticity, and the viscous elasticity is a property that is characteristically seen in a macro-molecule material, such as gel-like component, plastics, rubber and the like. Therefore, various kinds of gel-like components can be used as the viscous elastic members 18 and 19. Moreover, as the viscous elastic members 18 and 19, there can be used natural rubber, diene rubber (such as, styrene-butadiene rubber, isoprene rubber, and butadiene rubber), chloroprene rubber, acrylonitrile-butadiene rubber, and the like), non-diene rubber (for example, butyl rubber, ethylene-propylene rubber, ethylene-propylene-diene rubber, urethane rubber, silicone rubber, fluorine rubber, and the like), various kinds of rubber materials such as thermoplastic elastomer and the like, as well as their modified materials. The viscous elastic members 18 and 19 are provided with a linear or non-linear extending property in relation to an extending direction. For example, the viscous elastic members 18 and 19 are provided with an extending property with which a non-linear element (spring coefficient) is greater than a linear element (spring coefficient), at a time of being compressed in a thickness direction (axial direction) so as to have a compressed deformation. In the meantime, the viscous elastic members 18 and 19 are provided with an extending property with which a linear element (spring coefficient) is greater than a non-linear element (spring coefficient), at a time of being pulled in the thickness direction (axial direction) so as to become extended. Therefore, at the time when the viscous elastic members 18 and 19 are compressed in the thickness direction (axial direction) between the movable element 3 and the supporting element 2 so as to have a compressed deformation, a great deformation of the viscous elastic members 18 and 19 can be controlled in such a way that a great change in a gap between the movable element 3 and the supporting element 2 can be controlled. On the other hand, in the case where the viscous elastic members 18 and 19 are deformed in a direction intersecting (shearing direction) with the thickness direction (axial direction), a deformation is made in a direction of extension by way of a pulling force, in either cases of a movement direction; so that, the viscous elastic members 18 and 19 have a deformation property with which a linear element (spring coefficient) is greater than a non-linear element (spring coefficient). Therefore, in the viscous elastic members 18 and 19, a spring force in relation to a movement direction becomes constant. Accordingly, repeatability of an acceleration of vibration in relation to an input signal can be improved by use of a spring element in a shearing direction of the viscous elastic members 18 and 19, so that a vibration having a delicate nuance can be materialized. Incidentally, immobilization of the viscous elastic members 18 and 19 to the external yoke 9 as well as immobilization of the viscous elastic members 18 and 19 to the case 3 are carried out by use of an adhesive, or a gluing agent, or by making use of an adhesive property of silicone-gel.

(Operation)

In the linear actuator 1 of the present embodiment; if the coils 5 are supplied with electric power from external (a higher-level device) by the intermediary of the wiring substrate 25, the movable element 6 is moved in the direction of the axis line L in a reciprocating manner, by the magnetic drive mechanism 10 including the coils 5 and the permanent magnets 7. Then, a user holding the linear actuator 1 with hand can obtain information by way of a vibration from the linear actuator 1. At the time, with regard to a signal waveform to be applied to the coils 5, a frequency is modified according to information to be transmitted. Furthermore, with regard to the signal waveform to be applied to the coils 5, a polarity is reversed; and at the time, there is provided a difference in high and low speeds in a negative-polarity interval and a positive-polarity interval of a drive signal, in relation to a change of voltage. As a result, there is generated a difference between acceleration at a time when the movable element 6 moves toward the one side L1 in the direction of the axis line L, and acceleration at a time when the movable element 6 moves toward the other side L2 in the direction of the axis line L. Therefore, it is possible to make the user have illusion of the linear actuator 1 moving toward the one side L1 or the other side L2 in the direction of the axis line L.

Furthermore, in the linear actuator 1 of the present embodiment; a pressure change is discharged as an audible level sound from the sounding hole 360 of the case 3, the pressure change being in accordance with a vibration of the movable element 6 in the direction of the axis line L. Therefore, it is possible to output information by use of a sound discharged from the sounding hole 360.

(Primary Advantageous Effect of the Present Embodiment)

As explained above, in the linear actuator 1 of the present embodiment; in the movable element 6, the plurality of permanent magnets 7 are stacked in the direction of the axis line L; and in the meantime, the permanent magnets positioned next to each other in the direction of the axis line L are placed in such a way that the same-polarity parts face each other, so that density of magnetic flux, generated from a location between the permanent magnets 7 positioned next to each other, is high. Accordingly, even in the case of enhancing a thrust power, the number of permanent magnets 7 can be reduced so that an increase of a dimension of the movable element 6 in the direction of the axis line L can be controlled. Furthermore, the viscous elastic members 18 and 19 for suppressing resonance of the movable element 6 are provided at a plurality of locations being separate in the direction of the axis line L, so that the movable element 6 can appropriately be supported by the viscous elastic members 18 and 19, without using any spring component, even though the dimension of the movable element 6 in the direction of the axis line L is great. Moreover, since there are stacked three or more permanent magnets 7 in the movable element 6, a thrust power can be enhanced; and even in that case, the number of permanent magnets 7 can be still less.

Furthermore, since the sleeve 8 surrounds a circumferential section of the permanent magnets 7 in the movable element 6, straightness of a stacked assembly of the plurality of permanent magnets 7 in a direction along the axis line L can be secured by the sleeve 8, and a repulsion force acting between the permanent magnets 7 positioned next to each other in the direction of the axis line can be controlled by the first magnetic plate 91 and the second magnetic plate 92.

Still further, since there are provided the grooves 491 and 492 on the external circumferential surface of the bobbin 4, for guiding the end part of the coil wire that makes up the coils 5 in the direction of the axis line L, the end part of the coil wire can be guided up to a prescribed position by making use of the external circumferential surface of the bobbin 4, even in the case where the coils 5 are provided in plurality in the direction of the axis line L.

Moreover, the stopper 14 for regulating the movable range of the movable element 6 in the direction perpendicular to the axis line L, is made up by use of the small diameter part 37 of the case 3 and the large diameter part 97 of the external yoke 9, so that the external yoke 9 contacts the torso part 35 of the case 3 before the bobbin 4 contacts the sleeve 8 and the coils 5 contact the external yoke 9. Therefore, a damage on the bobbin 4 and the coils 5 can be suppressed.

Furthermore, the viscous elastic members 18 and 19 are placed, between the external yoke 9 and the torso part 35 of the case 3, being at both sides of the one side L1 and the other side L2 in the direction of the axis line L, in relation to the stopper 14; and therefore the movable element 6 can appropriately be supported by the viscous elastic members 18 and 19. Moreover, the viscous elastic members 18 and 19 are provided at locations in the stationary element 2 and the movable element 6, the locations being face-to-face in a radial direction (i.e., a direction perpendicular to the axis line L); and therefore it is possible to suppress resonance at a time of vibrating the movable element 6 in the direction of the axis line L, by the viscous elastic members 18 and 19. At the time, the viscous elastic members 18 and 19 deform in a shearing direction; and then, the viscous elastic members 18 and 19 have a deformation property with which a linear element is greater than a non-linear element. Therefore, repeatability of an acceleration of vibration in relation to an input signal can be improved, so that a vibration having a delicate nuance can be materialized. Accordingly, even though an interval changes between the stationary element 2 and the movable element 6 at a location where those two elements face to each other in the radial direction; it is possible to suppress resonance at a time when the movable element 6 vibrates in the direction of the axis line L, because a change in elastic modulus of the viscous elastic members 18 and 19 is less.

Still further, in the present embodiment, the case 3 is provided with a plurality of casing members (the first casing member 31 and the second casing member 32) arranged in a circumferential direction, and therefore it is easy to place the viscous elastic members 18 and 19 inside the case 3.

Moreover, in the bottom plate part 36 of the case 3, there is provided the sounding hole 360 that discharges a pressure change, in accordance with a vibration of the movable element 6 in the direction of the axis line L, as an audible level sound; and therefore the user can obtain information by way of vibration sensed with hand, and can furthermore obtain information by way of the sound discharged from the sounding hole 360.

OTHER EMBODIMENT

Though in the embodiment described above, the bottom plate part 36 having the sounding hole 360 is provided at the other side L2 in the direction of the axis line L in the case 3, a bottom plate part having a sounding hole may be provided at the one side L1 in the direction of the axis line L.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A linear actuator comprising:
    a movable element comprising a plurality of permanent magnets stacked in a direction of an axis line;
    a stationary element comprising a plurality of coils surrounding a circumferential section of the permanent magnets, the plurality of coils being placed along the axis line; and
    viscous elastic members inserted between the movable element and the stationary element;
    wherein, the plurality of permanent magnets are arranged such that, among adjacent permanent magnets of the plurality of permanent magnets, sides of the adjacent permanent magnets facing each other have a same polarity;
    the viscous elastic members are provided at a plurality of locations being separate in the direction of the axis line, in a space sandwiched in a radial direction by the movable element and the stationary element, and
    the viscous elastic members are provided in a portion where the movable element and the stationary element face each other in the radial direction perpendicular to the direction in which the movable element reciprocates linearly.

2. The linear actuator according to claim 1;
    wherein three or more permanent magnets are stacked in the movable element.

3. The linear actuator according to claim 1;
    wherein the movable element comprises:
        a sleeve, the sleeve being non-magnetic and cylindrical and surrounding a circumferential section of the permanent magnets;
        a first magnetic plate provided at a first end side of the sleeve in the direction of the axis line, and contacting a first permanent magnet of the plurality of permanent magnets;
        a second magnetic plate, being provided at a second end side of the sleeve in the direction of the axis line, and contacting a second permanent magnet of the plurality of permanent magnets; and
        an external yoke comprising a cylindrical part that surrounds the coils at an external side in a radial direction;
    wherein, the first magnetic plate and a first end of the cylindrical part in the direction of the axis line are connected to each other; and
    the second magnetic plate and a second end of the cylindrical part in the direction of the axis line are connected to each other.

4. The linear actuator according to claim 3;
    wherein, the first magnetic plate comprises
        a first plate part connected to the first end of the cylindrical part, and
        a first convex part that protrudes from the first plate part toward an internal side of the sleeve in such a way as to contact the first permanent magnet; and
    the second magnetic plate comprises:
        a second plate part connected to the second end of the cylindrical part, and
        a second convex part that protrudes from the second plate part toward an internal side of the sleeve in such a way as to contact the second permanent magnet.

5. The linear actuator according to claim 4;
    wherein the stationary element comprises a case having a torso part surrounding a circumferential section of the external yoke; and
    at least one of the cylindrical part of the external yoke and the torso part of the case protrudes toward the other, in such a way as to form a stopper that regulates a movable range of the movable element in a direction perpendicular to the axis line.

6. The linear actuator according to claim 5;
    wherein the plurality of viscous elastic members are placed between the external yoke and the torso part at both sides of the stopper in the direction of the axis line.

7. The linear actuator according to claim 6;
    wherein, the torso part in the case comprises a plurality of casing members arranged in a circumferential direction.

8. The linear actuator according to claim 3;
    wherein, the first magnetic plate is connected to the cylindrical part by way of welding, and
    the external yoke is formed in such a way as to make the cylindrical part and the second magnetic plate as a single section.

9. The linear actuator according to claim 3;
    wherein, the stationary element comprises:
        a first bobbin holder placed at a first side in the direction of the axis line in relation to the first magnetic plate;
        a second bobbin holder placed at a second side in the direction of the axis line in relation to the second magnetic plate; and
        a bobbin having a tubular shape, the bobbin extending between the plurality of permanent magnets and the external yoke in the direction of the axis line; and
    wherein the plurality of coils is wound on an external circumferential surface of the bobbin; and
    the first magnetic plate comprises a first through-hole part through which a first connecting part, for connecting the bobbin and the first bobbin holder, passes; and
    the second magnetic plate comprises a second through-hole part, through which a second connecting part, for connecting the bobbin and the second bobbin holder, passes.

10. The linear actuator according to claim 9;
wherein the first connecting part comprises a first connecting plate that protrudes from the bobbin toward the first bobbin holder, so as to be connected to the first bobbin holder; and
the second connecting part comprises a second connecting plate that protrudes from the bobbin toward the second bobbin holder, so as to be connected to the second bobbin holder.

11. The linear actuator according to claim 10;
wherein the first connecting part comprises a first supporting plate that protrudes from the first bobbin holder toward the bobbin, and overlaps with the first connecting plate; and
the second connecting part comprises a second supporting plate that protrudes from the second bobbin holder toward the bobbin, and overlaps with the second connecting plate.

12. The linear actuator according to claim 9;
wherein a groove is provided on an external circumferential surface of the bobbin in order to guide an end part of a coil wire that makes up the plurality of coils, in the direction of the axis line.

13. A device for notifying of information by way of a vibration, the device comprising:
a linear actuator for generating the vibration;
the linear actuator comprising:
a movable element comprising a plurality of permanent magnets stacked in a direction of an axis line;
a stationary element comprising a plurality of coils surrounding a circumferential section of the permanent magnets, the plurality of coils being placed along the axis line; and
viscous elastic members inserted between the movable element and the stationary element;
wherein, the plurality of permanent magnets are arranged such that, among adjacent permanent magnets of the plurality of permanent magnets, sides of the adjacent permanent magnets facing each other have a same polarity; and
the viscous elastic members are provided at a plurality of locations being separate in the direction of the axis line, in a space sandwiched in a radial direction by the movable element and the stationary element;
wherein the movable element comprises:
an external yoke comprising a cylindrical part that surrounds the coils at an external side in a radial direction;
wherein the stationary element comprises a case having a torso part surrounding a circumferential section of the external yoke; and
wherein, the case comprises a bottom plate part at either one of the one side and the other side in the direction of the axis line; and
in the bottom plate part, there is provided a sounding hole that discharges a pressure change, in accordance with a vibration of the movable element in the direction of the axis line, as an audible level sound;
with regard to a signal waveform to be applied to the coils, a frequency is modified according to information to be transmitted;
a user holding the linear actuator with hand can obtain information by way of a vibration from the linear actuator and can furthermore obtain information by way of the sound discharged from the sounding hole.

14. The linear actuator according to claim 13;
at least one of the cylindrical part of the external yoke and the torso part of the case protrudes toward the other, in such a way as to form a stopper that regulates a movable range of the movable element in a direction perpendicular to the axis line
wherein the plurality of viscous elastic members are placed between the external yoke and the torso part at both sides of the stopper in the direction of the axis line.

15. The linear actuator according to claim 14;
wherein the torso part in the case comprises a plurality of casing members arranged in a circumferential direction.

16. A device for notifying of information by way of a vibration, the device comprising:
a linear actuator for generating the vibration;
the linear actuator comprising:
a movable element comprising a plurality of permanent magnets stacked in a direction of an axis line;
a stationary element comprising a plurality of coils surrounding a circumferential section of the permanent magnets, the plurality of coils being placed along the axis line; and
viscous elastic members inserted between the movable element and the stationary element;
wherein, the plurality of permanent magnets are arranged such that, among adjacent permanent magnets of the plurality of permanent magnets, sides of the adjacent permanent magnets facing each other have a same polarity;
the viscous elastic members are provided at a plurality of locations being separate in the direction of the axis line, in a space sandwiched in a radial direction by the movable element and the stationary element with regard to a signal waveform to be applied to the coils, a frequency is modified according to information to be transmitted;
a user holding the linear actuator with hand can obtain information by way of a vibration from the linear actuator, and
the viscous elastic members are provided in a portion where the movable element and the stationary element face each other in the radial direction perpendicular to the direction in which the movable element reciprocates linearly.

17. The device for notifying of information by way of a vibration according to claim 16,
wherein the movable element comprises:
a sleeve, the sleeve being non-magnetic and cylindrical and surrounding a circumferential section of the permanent magnets;
a first magnetic plate provided at a first end side of the sleeve in the direction of the axis line, and contacting a first permanent magnet of the plurality of permanent magnets;
a second magnetic plate, being provided at a second end side of the sleeve in the direction of the axis line, and contacting a second permanent magnet of the plurality of permanent magnets; and
an external yoke comprising a cylindrical part that surrounds the coils at an external side in a radial direction;
wherein, the first magnetic plate and the a first end of the cylindrical part in the direction of the axis line are connected to each other; and
the second magnetic plate and a second end of the cylindrical part in the direction of the axis line are connected to each other.

18. The device for notifying of information by way of a vibration according to claim 17,
- wherein the stationary element comprises a case having a torso part surrounding a circumferential section of the external yoke; and
- at least one of the cylindrical part of the external yoke and the torso part of the case protrudes toward the other, in such a way as to form a stopper that regulates a movable range of the movable element in a direction perpendicular to the axis line.

19. The device for notifying of information by way of a vibration according to claim 18,
- wherein the plurality of viscous elastic members are placed between the external yoke and the torso part at both sides of the stopper in the direction of the axis line.

20. The device for notifying of information by way of a vibration according to claim 19,
- wherein, the torso part in the case comprises a plurality of casing members arranged in a circumferential direction.

* * * * *